US012798696B2

(12) United States Patent
Skynar et al.

(10) Patent No.: US 12,798,696 B2
(45) Date of Patent: Nov. 17, 2026

(54) DEPLOYABLE FABRIC AERO DIFFUSER

(71) Applicant: FCA US LLC, Auburn Hills, MI (US)

(72) Inventors: Mark J Skynar, Farmington Hills, MI (US); Samarasingham Jeyasingham, Sterling Heights, MI (US); Arturo Guzman-Magana, LaSalle (CA)

(73) Assignee: FCA US LLC, Auburn Hills, MI (US)

( * ) Notice: Subject to any disclaimer, the term of this patent is extended or adjusted under 35 U.S.C. 154(b) by 380 days.

(21) Appl. No.: 18/508,410

(22) Filed: Nov. 14, 2023

(65) Prior Publication Data

US 2025/0153787 A1 May 15, 2025

(51) Int. Cl.
*B62D 35/00* (2006.01)

(52) U.S. Cl.
CPC .................................. *B62D 35/007* (2013.01)

(58) Field of Classification Search
CPC .................................................... B62D 35/007
USPC ....................................................... 269/180.1
See application file for complete search history.

(56) References Cited

U.S. PATENT DOCUMENTS 4,997,021 A * 3/1991 Brutsaert ............ E04F 10/0618 135/88.11
6,874,559 B1 * 4/2005 Hicks .................. E04F 10/0685 160/22
2004/0159407 A1 * 8/2004 Girard ................. E04F 10/0659 160/66
2006/0060307 A1 * 3/2006 Heitel ................. E04F 10/0618 160/66
2011/0132552 A1 * 6/2011 Prine, Sr. .............. E04F 10/064 160/369
2014/0097638 A1 4/2014 Froling et al.
2017/0137075 A1 * 5/2017 Povinelli ................ B62D 37/02
2023/0048645 A1 * 2/2023 Leese .................. E04F 10/0692
2023/0069094 A1 * 3/2023 Moradnia ............ B62D 35/007
2023/0383823 A1 * 11/2023 Giannella ................ H02K 7/06
2024/0034419 A1 * 2/2024 Pakkam ................... B60J 7/141
2024/0217316 A1 * 7/2024 Stevenson ................ B60J 11/04
2024/0417008 A1 * 12/2024 Moradnia ............ B62D 35/005

FOREIGN PATENT DOCUMENTS

| | | | |
|---|---|---|---|
| DE | 102013105842 | B4 | 3/2022 |
| DE | 102013105843 | B4 | 8/2022 |
| EP | 3177510 | B1 | 1/2020 |

* cited by examiner

*Primary Examiner* — Kambiz Abdi
(74) *Attorney, Agent, or Firm* — Jeremy J. Klobucar

(57) ABSTRACT

A vehicle including a vehicle body and a diffuser configured to alter aerodynamic characteristics of the vehicle mounted to the vehicle body. The diffuser may include a housing attached to the vehicle bod and a fabric panel attached to the housing that is configured to move between a stowed position located within the housing and a deployed position where the fabric panel extends outward from the housing and relative to the vehicle body, where the fabric panel alters the aerodynamic characteristics of the vehicle when in the deployed position. At least one strut is configured to support the fabric panel when the fabric panel is in the deployed position and be stowed with the fabric panel in the housing when the fabric panel is in the stowed position.

12 Claims, 9 Drawing Sheets

DEPLOYABLE FABRIC AERO DIFFUSER

FIELD

The present disclosure relates to a deployable fabric aero diffuser.

BACKGROUND

This section provides background information related to the present disclosure which is not necessarily prior art.

Diffusers may be provided on vehicles to improve the aerodynamic properties of the vehicle, which in turn may increase the vehicle's gas mileage or its electric range. Conventional diffusers are solid members that may be expensive to manufacture because each time a new vehicle is designed, the diffuser must also be designed relative to the new vehicle. For example, a new mold for the diffuser must be separately designed and manufactured to produce the diffuser. Further, because diffusers are solid members, when the conventional diffuser is stowed, the solid diffuser will occupy the same amount of space as when the diffuser is deployed. Inasmuch as storage space in the vehicle can be limited, the storage of the diffuser in the vehicle when not deployed can take away space that can be used for other purposes.

SUMMARY

According to an aspect of the present disclosure, there is provided a vehicle including a vehicle body; and a diffuser configured to alter aerodynamic characteristics of the vehicle mounted to the vehicle body, wherein the diffuser includes: a housing attached to the vehicle body; a fabric panel attached to the housing that is configured to move between a stowed position located within the housing and a deployed position where the fabric panel extends outward from the housing and relative to the vehicle body, the fabric panel altering the aerodynamic characteristics of the vehicle when in the deployed position; and at least one strut that is configured to support the fabric panel when the fabric panel is in the deployed position and be stowed with the fabric panel in the housing when the fabric panel is in the stowed position.

According to the aspect, the diffuser may further include a roller tube including a spool, wherein the fabric panel is rolled over the spool when the fabric panel is in the stowed position and unrolled from the spool when the fabric panel is in the deployed position.

According to the aspect, the fabric panel has a first end attached to the housing and a second end attached to the spool, in the deployed position of the fabric panel the roller tube is located distal from the housing and supported by the at least one strut, and in the stowed position of the fabric panel when the fabric panel is rolled over the spool, the roller tube is positioned within the housing.

According to the aspect, the at least one strut includes a first end attached to the housing and a second end attached to the roller tube.

According to the aspect, the at least one strut includes a first end attached to a pinion that is movably translatable along a rack that is provided in the housing and a second end that is pivotably connected to the roller tube.

According to the aspect, the at least one strut includes a first arm and a second arm, the first arm being pivotably connected to the housing and pivotably connected to the second arm, and the second arm being pivotably connected to the roller tube.

According to the aspect, the diffuser may further include a motor configured to pivot the first arm relative to the housing.

According to the aspect, the vehicle may further include a controller in communication with the motor, the controller being configured to actuate the motor to pivot the first arm relative to the housing to move the fabric panel to the deployed position when the vehicle reaches a predetermined velocity, and configured to actuate the motor to pivot the first arm relative to the housing to move the fabric panel to the stowed position when a velocity of vehicle falls below the predetermined velocity.

According to the aspect, the roller tube is located within and fixed to the housing, the fabric panel has a first end attached to the spool and a second end attached to an elongated rod, and in the deployed position of the fabric panel the elongated rod is located distal from the housing and supported by the at least one strut.

According to the aspect, the at least one strut includes a first end attached to the housing and a second end attached to the elongated rod.

According to the aspect, the at least one strut includes a first arm and a second arm, the first arm being pivotably connected to the housing and pivotably connected to the second arm, and the second arm being pivotably connected to the elongated rod.

According to the aspect, the diffuser may further include a motor configured to pivot the first arm relative to the housing.

According to the aspect, the vehicle may further include a controller in communication with the motor, the controller being configured to actuate the motor to pivot the first arm relative to the housing to move the fabric panel to the deployed position when the vehicle reaches a predetermined velocity, and configured to actuate the motor to pivot the first arm relative to the housing to move the fabric panel to the stowed position when a velocity of vehicle falls below the predetermined velocity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
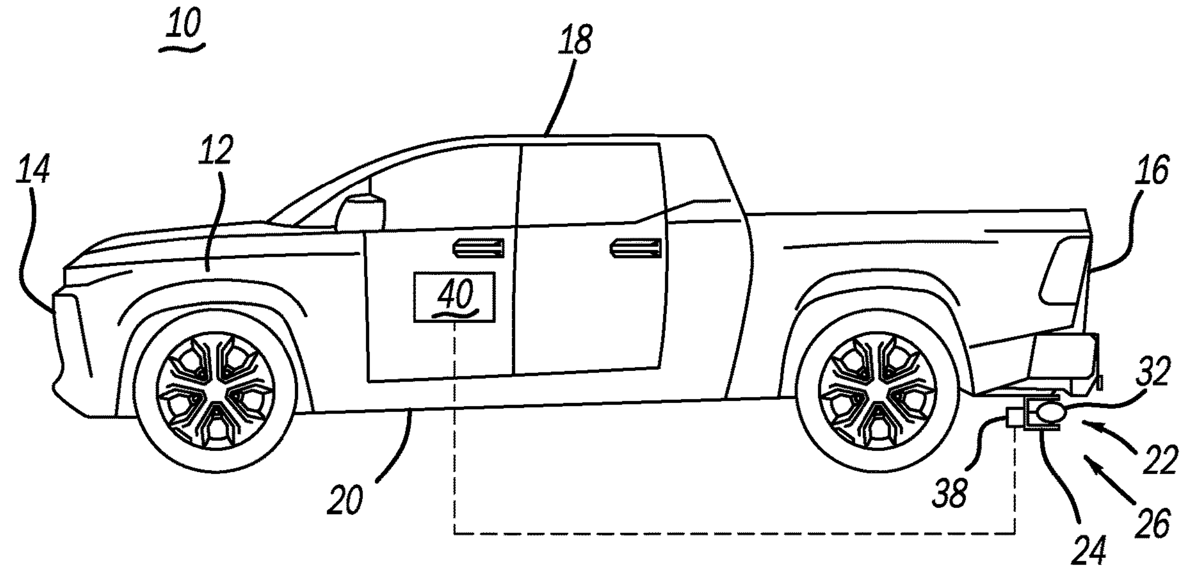
FIG. 1 illustrates a vehicle including an example diffuser according to a principle of the present disclosure, with the diffuser being in a stowed position.
Figure 2:
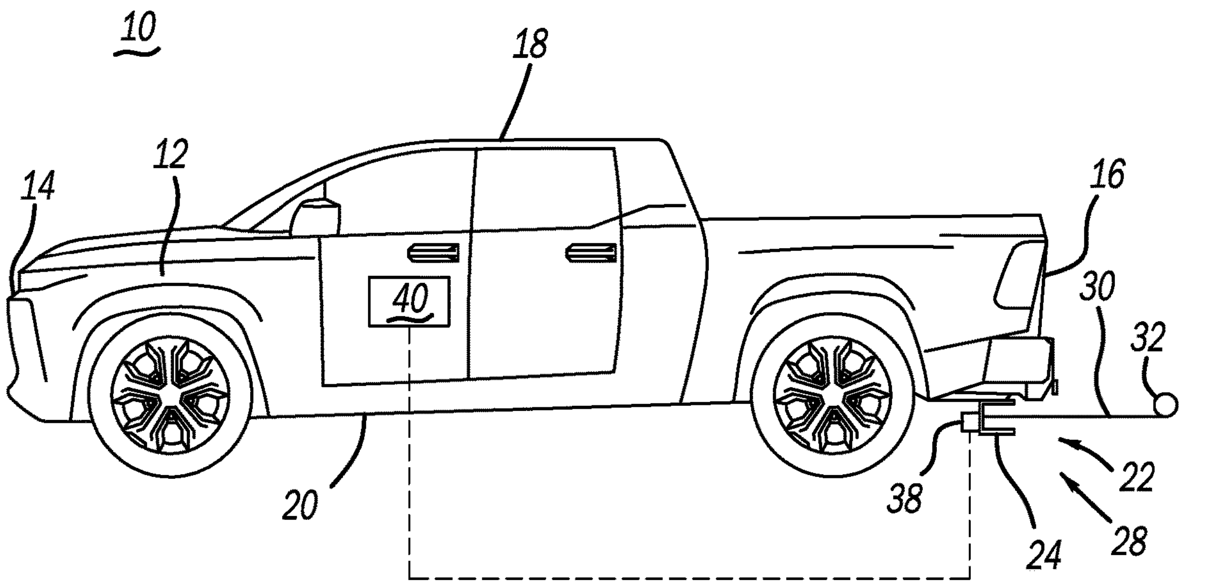
FIG. 2 illustrates the vehicle of FIG. 1, with the example diffuser in a deployed position.

FIGS. 1 and 2 illustrate a vehicle 10, which has a vehicle body 12. Body 12 includes a front end 14, a rear end 16, a top side 18, and an underside 20. In the illustrated embodiment, a diffuser 22 that, when deployed, is configured to improve the aerodynamic properties of the vehicle 10 is attached to the underside 20 of the vehicle 10. Diffuser 22 includes a housing 24 that may be attached (i.e., fixed) to the underside 20 of the vehicle 10 in any manner known to those skilled in the art, including, for example, by using fasteners (not shown) such as bolts, welding, or any other attachment method known to one skilled in the art. The diffuser 22 according to the present disclosure, as will be described in more detail later, is deployable from a stowed position 26 to a deployed position 28, and may be formed of a non-rigid material such as a fabric. By forming diffuser 22 from a non-rigid material such as fabric, diffuser 22 is easily manufactured and does not require formation of a specific mold like those used to form conventional diffusers that are formed of a rigid material.

The fabric of diffuser 22 is preferably formed from a polymeric material such as polyamide (i.e., NYLON®) to be flexible yet more rigid in comparison to other fabrics such as those made from natural materials such as cotton, and to be more weather-resistant. Other polymeric materials such as polyethylene or polypropylene may be used in place of polyamide. Further, it should be understood that the fabric may be formed of a natural material such as cotton, but formed to include a polymeric coating that provides increased rigidity and weather resistance.

Diffuser 22 comprises a diffuser sheet 30 that is formed of fabric, is configured to roll into and roll out of a roller tube 32 when deploying and storing the diffuser 22. That is, in one embodiment (see, e.g., FIG. 3), a first end 34 of sheet can be connected to housing 24 and a second end 35 can be attached to a spool 36 located within roller tube 32. As the diffuser 22 is actuated from the stowed position 26 to the deployed position 28 when the roller tube 32 moves away from the housing 24, the sheet 30 will unroll from the spool 36. The diffuser sheet 30 may be rolled into or rolled out of the roller tube 32 in many different ways. For example, the diffuser sheet 30 may be rolled out of or rolled into the roller tube 32 using one or more motors 38 attached to or located proximate to housing 24. The one or more motors 38 may roll the diffuser sheet 30 into or out of the roller tube 32 in many different ways, as will be described in more detail below relative to each of the embodiments of the present disclosure. The one or more motors 38 may be communicatively connected to a vehicle control system 40, which may send a signal to motor(s) 38 to deploy the diffuser sheet 30 when, for example, the vehicle 10 reaches a certain velocity (e.g., at velocities above 30 mph). Further, control system 40 can instruct motor(s) 38 to move the diffuser 30 to stowed position 26 when, for example, vehicle 10 is travelling below a predetermined velocity (e.g., 30 mph).

Figure 3:
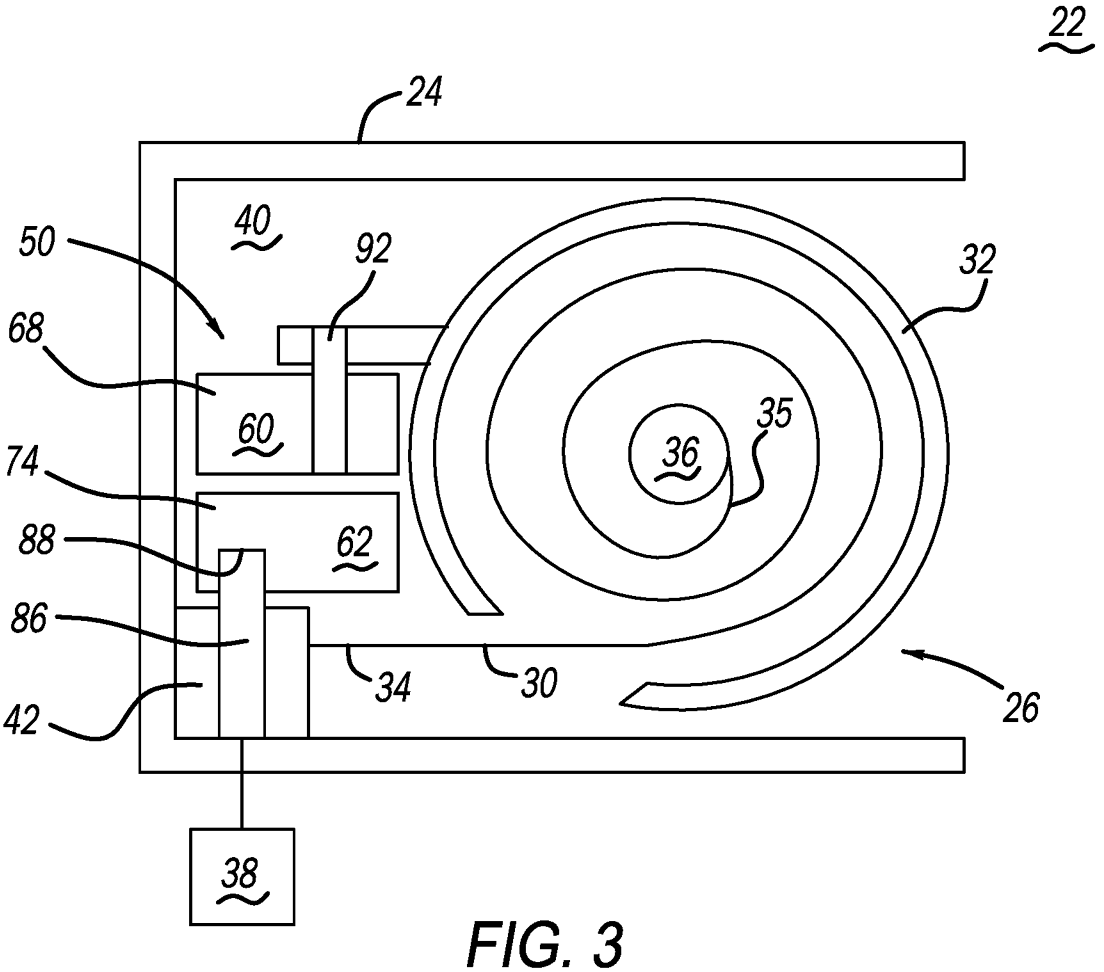
FIG. 3 is a schematic cross-sectional view of an example diffuser according to a principle of the present disclosure in a stowed position.

With reference to FIG. 1, the diffuser 22 is illustrated in the stowed position 26 on the underside 20 of the vehicle 10. To move the diffuser 22 from the deployed position 28 (FIG. 2) to the stowed position 26, the roller tube 32 may be moved towards the housing 24 using motor(s) 42. In the stowed position 26, the diffuser sheet 30 is rolled up inside the roller tube 32, and the roller tube 32 is at least partially if not entirely stowed within the housing 24 (FIG. 3).

It should be understood that when roller tube 32 is stowed within housing 24, the combination of roller tube 32 and housing 24 can be aesthetically designed to resemble a portion of a fascia of the vehicle 10. While diffuser 22 is illustrated as being beneath the rear 16 vehicle 10 in FIGS. 1 and 2, it should be understood that this is merely to convey how the diffuser 22 deploys to improve the aerodynamic characteristics of vehicle 10. In practice, diffuser 22 may be located on vehicle 10 such that the aesthetic nature of the vehicle 10 is not compromised (e.g., located in a bumper of vehicle 10, in a rear panel (e.g., lift gate or rear fascia)), or any other location desired by one skilled in the art.

Now referring to FIGS. 3 and 4, the structure of diffuser 22 according to one embodiment of the present disclosure will be described. As best shown in FIG. 3, housing 24 may be a C-shaped member formed of a metal or polymeric material defining an interior 40 that may extend along substantially an entire width of rear 16 of vehicle 10. Positioned within housing 24 may be an elongated crossbar 42 also formed of a metal or polymeric material having a length that is substantially equal to the length of housing 24. While crossbar 42 is illustrated as being a member separate from housing 24 that is attached by welding or some other attachment method, it should be understood that housing 24 may be formed to include crossbar 42 unitary therewith, if desired.

Roller tube 32 may be formed of a material similar to that of housing 24 and crossbar 42, and is a generally cylindrically shaped member having a longitudinally extending slot 44 that permits sheet 30 to enter and exit roller tube 32 diffuser 22 is moved between the stowed 26 and deployed 28 positions. As noted above, roller tube 32 may include spool 36 upon which the sheet 30 can be rolled. While not illustrated in FIG. 3, it should be understood that opposing ends 46 and 48 (FIG. 4) of roller tube.

32 may be capped or closed such that spool 36 can be positioned between opposing ends 46 and 48 and supported relative to roller tube 32.

Inasmuch as diffuser includes a sheet 30 formed of fabric, it will be necessary to provide structural support to sheet 30 when diffuser 22 is in the deployed position 28. To support sheet 30 and roller tube 32 when in the deployed position 28, one or more struts 50 may be attached between the housing 24 and the roller tube 32. In this regard, as noted above and as best shown in Figure, the roller tube 32 has opposing ends including a first roller tube end 46 and a second roller tube end 48. Similarly, the crossbar 42 of housing 24 may include a first crossbar end 52 and an opposite second base bar end 54. A first cap 56 may be attached to the first crossbar end 52, and a second cap 58 may be attached to the second crossbar end 58.

Figure 4:
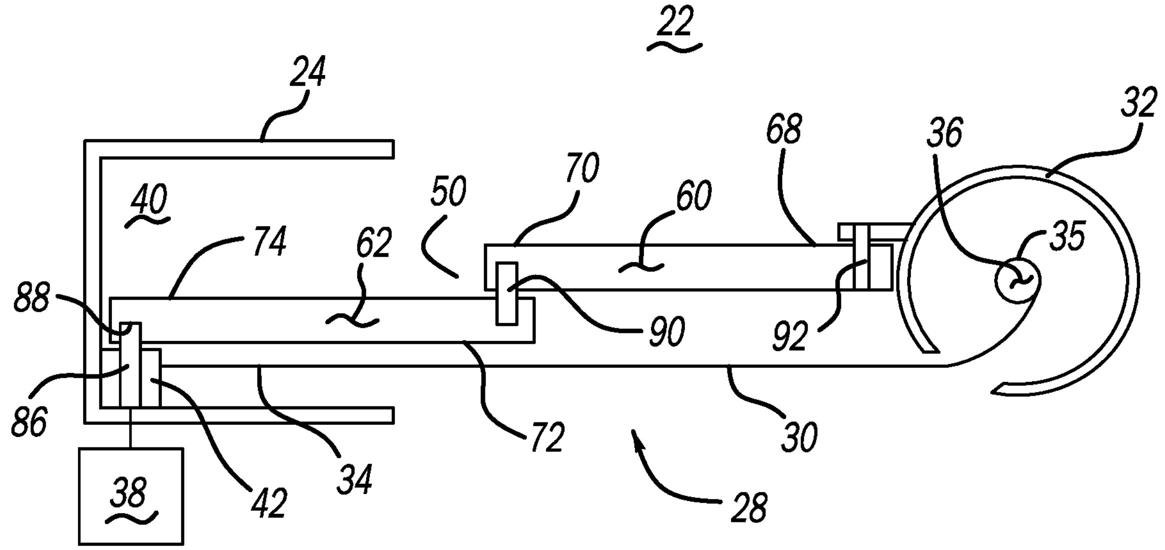
FIG. 4 is a schematic cross-sectional view of the example diffuser of FIG. 3 in a deployed position.
Figure 5:
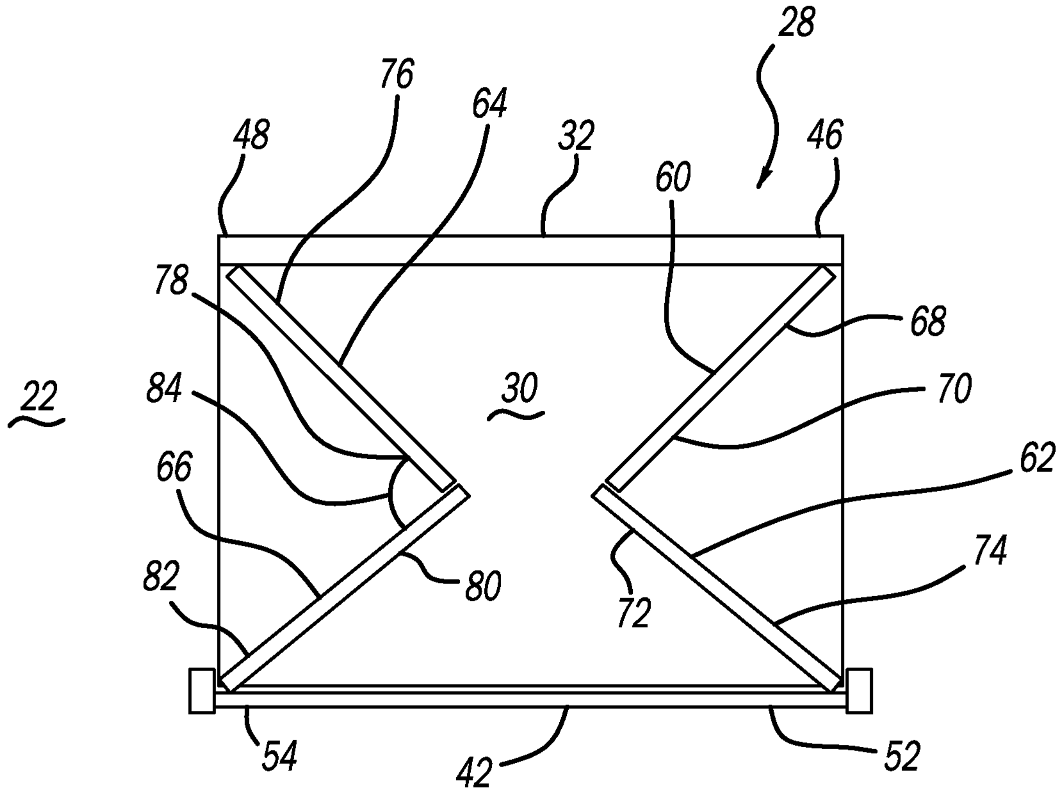
FIG. 5 is a schematic plan view of the diffuser illustrated in FIG. 4.

As best shown in FIGS. 4 and 5, where diffuser 22 is in the deployed position 28, the pair of struts 50 are used to support diffuser 22. One strut 50 may include a first arm 60 and a second arm 62 and the other strut 50 may include a third arm 64 and a fourth arm 66.

The first arm 60 may have a first arm first end 68 and a first arm second end 70. The first arm first end 68 may be pivotally connected to the first end 46 of roller tube 32. The second arm 62 may have a second arm first end 72 and a second arm second end 74. The second arm first end 72 may be pivotally connected to the first arm second end 70, and the second arm second end 74 may be pivotally connected to the first crossbar end 52. The third arm 64 may have a third arm first end 76 and a third arm second end 78. The third arm first end 76 may be pivotally connected to the second end 48 of roller tube 32. The fourth arm 66 may have a fourth arm first end 80 and a fourth arm second end 82. The fourth arm first end 80 may be pivotally connected to the third arm second end 78, and the fourth arm second end 82 may be pivotally connected to the second crossbar end 54.

In the deployed position 28, an angle 84 is formed between first arm 60 and the second arm 6, and between the third arm 64 and the fourth arm 66 (illustrated). In the deployed position 28, the angles 84 may be about ninety degrees.

To move the diffuser 22 from the deployed position 28 to the stowed position 22, the roller tube 32 is moved towards the housing 24 by actuating motor(s) 38, as will be described in more detail below. As the roller tube 32 is moved closer to the housing 24, the first arm 60 will pivot counter-clockwise relative to the first roller tube end 46, the second arm 62 will pivot clockwise relative to the first crossbar end 52, the third arm 64 will pivot clockwise relative to the second roller tube end 48, and the fourth arm 66 will pivot counter-clockwise relative to the second crossbar end 54. As the arms 60, 62, 64, and 66 move, the angle 84 will decrease from about ninety degrees to zero degrees. As roller tube 32 moves toward housing 24, the diffuser sheet 30 will roll into the roller tube 32, placing the diffuser 22 into the stowed position 26.

Similarly, to move the diffuser 22 from the stowed position 26 to the deployed position 28, the roller tube 32 is moved away from the housing 24. As the roller tube 32 is moved away from the housing 24, the first arm 60 will pivot clockwise relative to the first roller tube end 46, the second arm 62 will pivot counter-clockwise relative to the first crossbar end 52, the third arm 64 will pivot counter-clockwise relative to the second roller tube end 48, and the fourth arm 66 will pivot clockwise relative to the second crossbar end 54. As roller tube 32 moves away from housing 24, the angle 84 will increase from about zero degrees to about ninety degrees. Further, as the roller tube 32 moves away from the housing 24, the diffuser sheet 30 will roll out of the roller tube 32.

Figure 6:
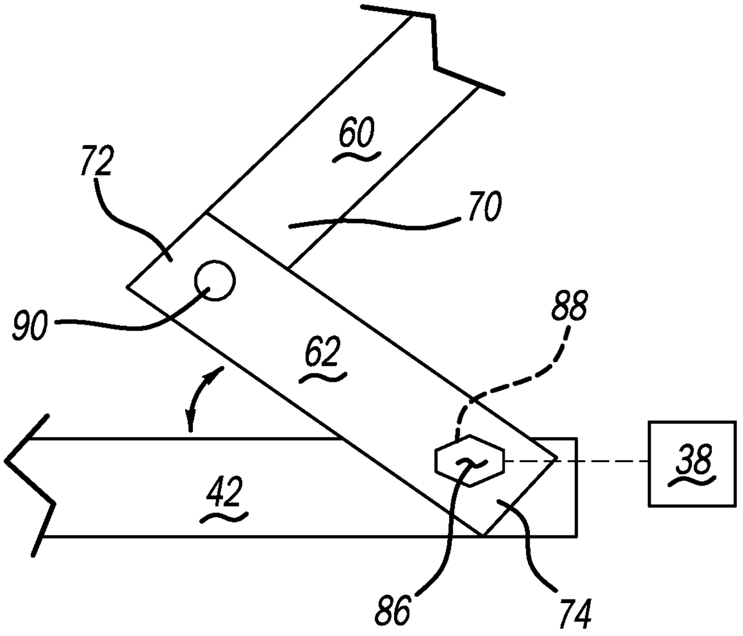
FIG. 6 is a schematic partial perspective view of an example strut of the diffuser illustrated in FIG. 5.

The one or more motors 38 may be used to move the second and fourth arms 62 and 66 to deploy/stow the diffuser 22. For example, referring to FIGS. 5 and 6, a motor 38 may be attached to a toothed gear 86 that is mated with a recess 88 formed in second end 74 of second arm 62. While only second arm 62 is shown in FIGS. 5 and 6, it should be understood that a similar arrangement can be provided on fourth arm 66. As the gear 86 is rotated by motor 38 in a clockwise direction, the second arm 62 will pivot away from crossbar 42. Movement of second arm 62 away from crossbar 42 will then cause the first arm 60 to pivot away from the second arm first end 72 of second arm 62. In this regard, second arm first end 72 of second arm 62 may be pivotably connected to first arm second end 70 of first arm 62 by a first pivot pin 90, and first arm first end 68 of first arm 60 may be pivotably connected to roller tube 32 by a second pivot pin 92 (see FIG. 3).

When diffuser 22 is moved from the deployed position 28 back to the stowed position 26, motor 38 will rotate gear 88 in the clockwise direction, which will pull fourth arm 66 back toward crossbar 42. Again referring to FIG. 3, in the stowed position 26, the roller tube 32 may be stowed within housing 24. In the stowed position 26, the diffuser sheet 30 will be rolled up inside the roller tube 32 about spool 36 and struts 50 will be folded within housing 24.

Figure 7:
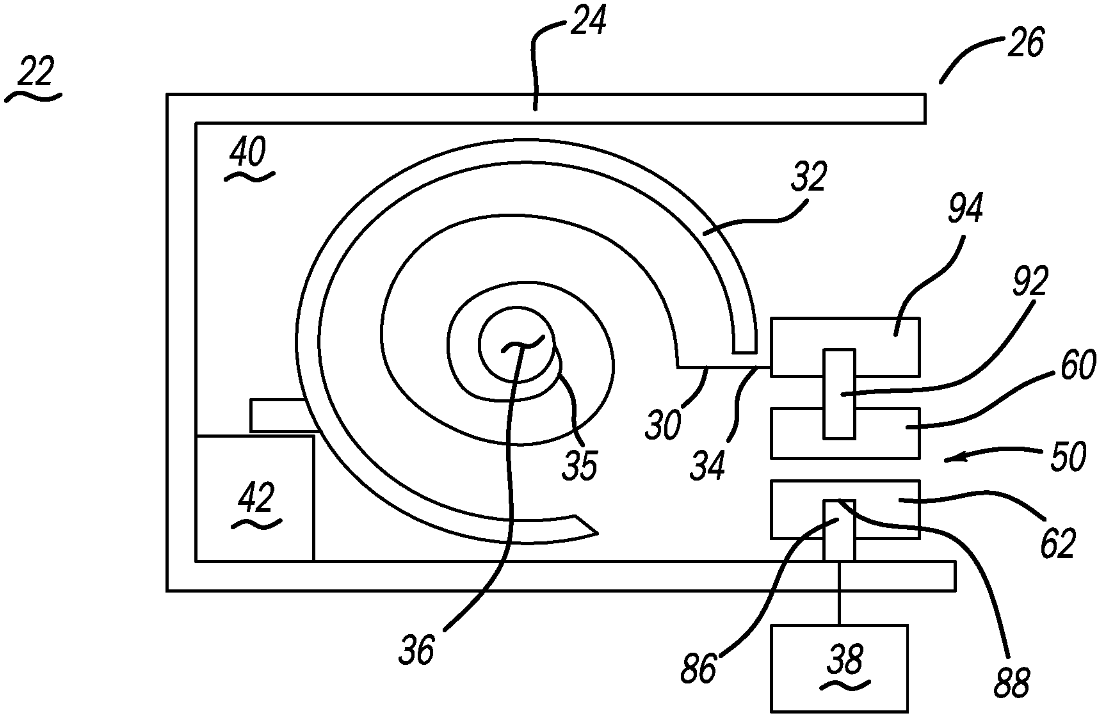
FIG. 7 is a schematic cross-sectional view of another example diffuser according to a principle of the present disclosure in a stowed position.
Figure 8:
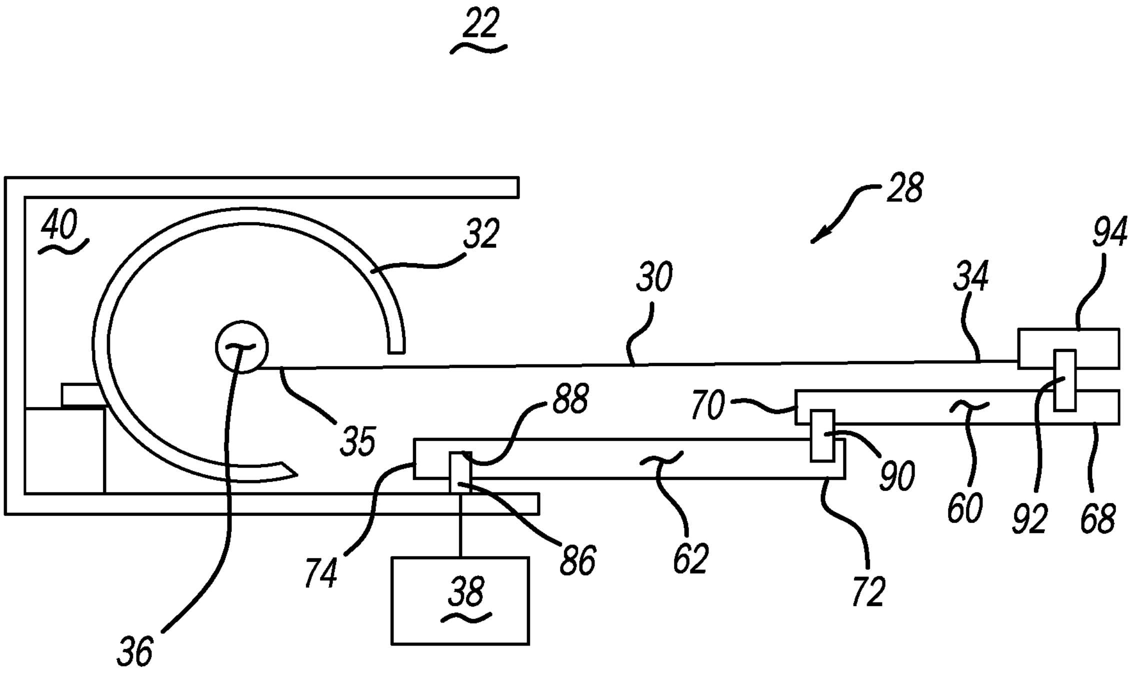
FIG. 8 is a schematic cross-sectional view of the example diffuser of FIG. 7 in a deployed position.
Figure 9:
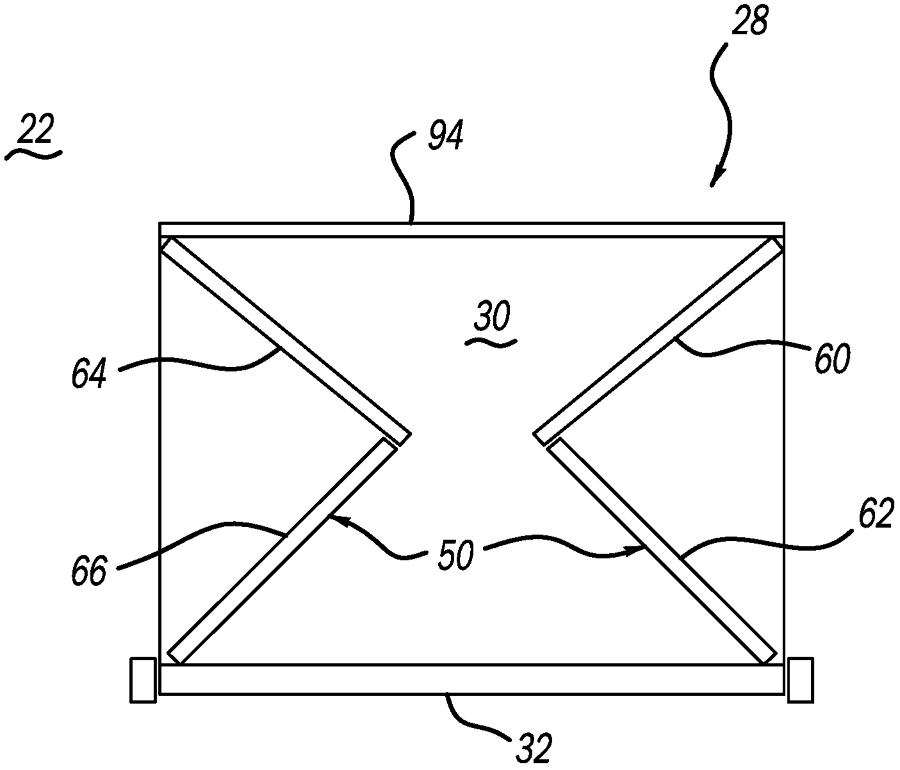
FIG. 9 is a schematic plan view of the diffuser illustrated in FIG. 8.

In the above-described embodiment, the roller tube 32 is located distal from housing 24 when diffuser 22 is in the deployed position 28. The present disclosure, however, should not be limited to such a configuration. Indeed, now referring to FIGS. 7 and 8, it can be seen that the roller tube 32 may be located proximate (e.g., stored within and fixed) the housing 24 when diffuser 22 is in the deployed position 28.

To support sheet 30 when diffuser 22 is in the deployed position 28, an elongated rod 94 may be attached to first end 34 of sheet 30, and the struts 50 connect the elongated rod 94 to the roller tube 32. While roller tube 32 is located proximate housing 24, it should be understood that diffuser 22 is moved in the same manner as that described above between the stowed and deployed positions 26 and 28. Notwithstanding, because rod 94 is located distal from housing 24 and because rod 94 has smaller dimensions in comparison to roller tube 32, the aerodynamic properties of diffuser 22 may be improved.

Figure 10:
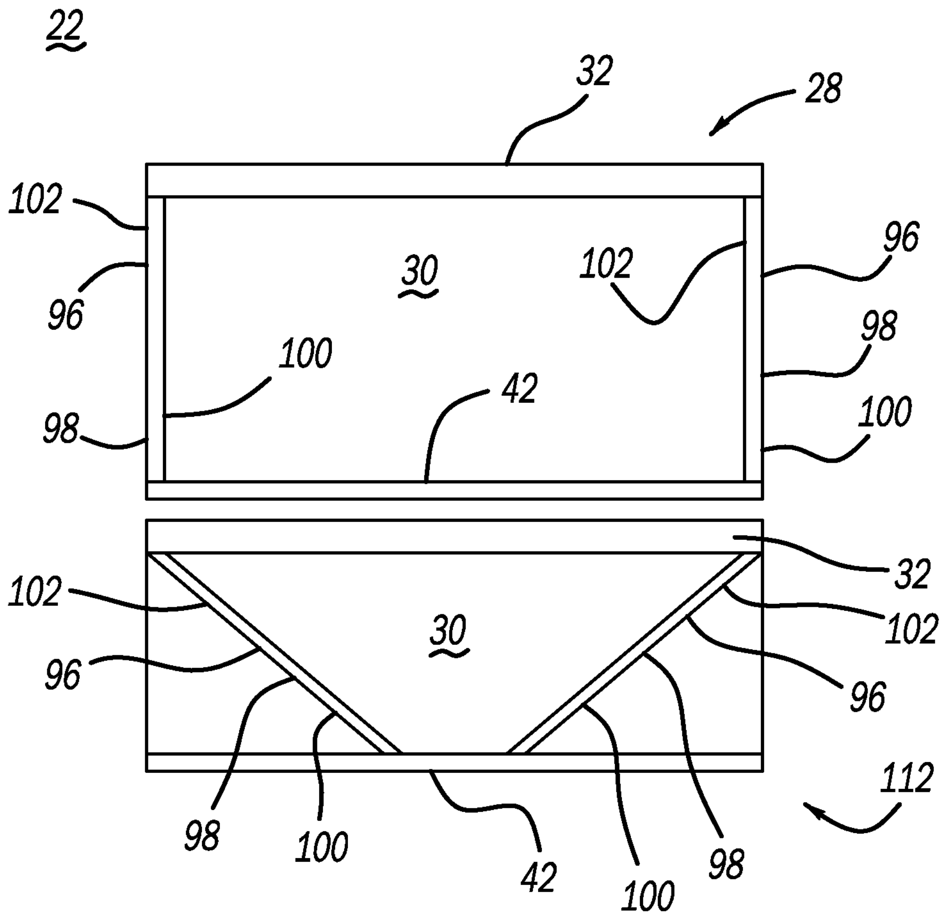
FIG. 10 is a schematic plan view of another example diffuser according to a principle of the present disclosure in a partially-deployed configuration and a fully deployed configuration.

Now referring to FIG. 10 a third embodiment of the present disclosure will be described. The embodiment shown in FIG. 10 is similar to the embodiment shown in FIGS. 3-5, but instead of using struts 50 that each include a pair of arms, the diffuser 22 includes struts 96 that consist of a single link. More specifically, each strut 96 may include a single link 98 having a first link end 100 attached to the crossbar 42 that is movable relative to the housing 24 using motor 38 and a second link end 102 that is pivotably connected to roller tube 32 at ends 46 and 48, respectively.

Figure 11:
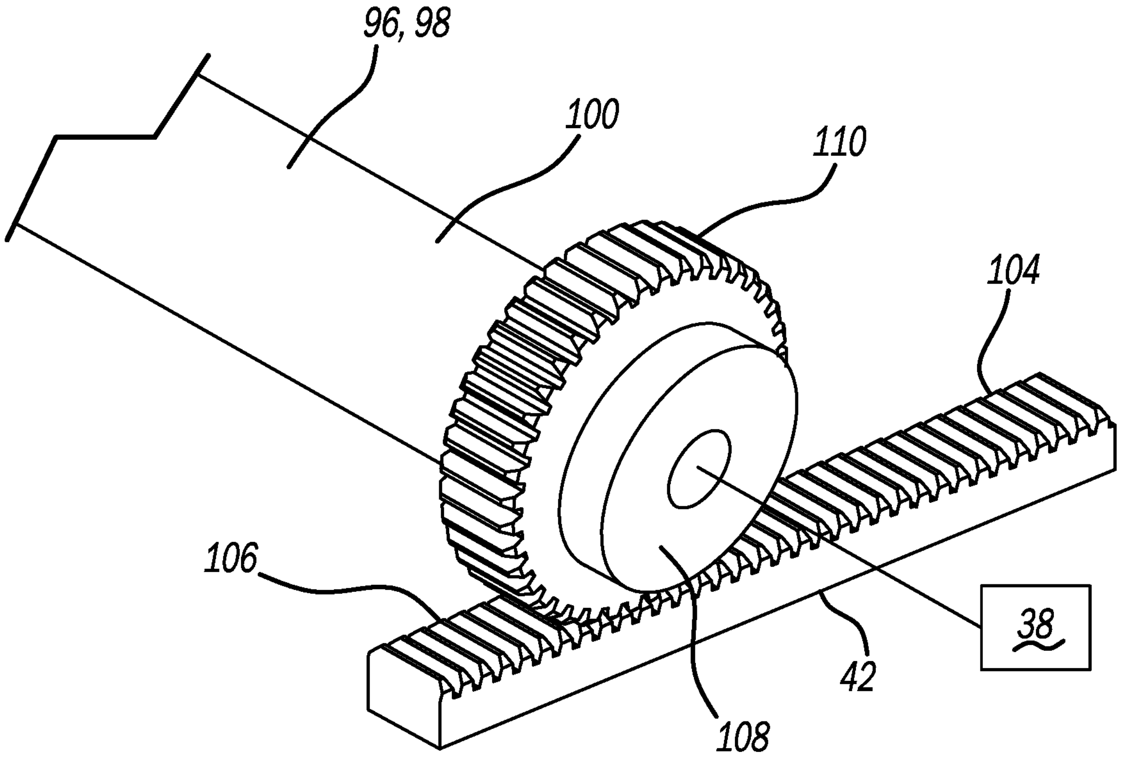
FIG. 11 illustrates an example configuration for actuating a strut used in the configuration of FIG. 10

To move links 98 such that diffuser 22 can be deployed, first link ends 100 are configured to translate along crossbar 42. As shown in FIG. 11, crossbar 42 can include a rack 104 including a plurality of first teeth 106, and first link ends 100 are connected to a pinion 108 configured to be rotated by motor 38 having a plurality of second teeth 110. Although not shown in FIG. 11, it should be understood that first link ends 100 may include, for example, a ball that mates with a socket formed in pinion 108 or some other type of hinged connection such that link 98 may pivot relative to pinion 108 during movement of pinion 108 and unroll sheet 30 from roller tube 32. As the first link end 100 translates along crossbar 42 (see, e.g., the intermediate position 112 shown in FIG. 10), the first link ends 100 will move from a center of crossbar 42 towards distal ends of the crossbar 48 until it reaches the deployed position 28. Other configurations that can be used in lieu of a rack and pinion configuration include, for example, a worm drive or linear guide.

FIG. 10 is directed to a configuration where roller tube 32 moves away from crossbar 42 during deployment of diffuser 22, like that shown in FIGS. 3-5. It should be understood, however, that the struts 96 shown in FIG. 10 can also be applied to a configuration where roller tube 32 remains mated with housing 24 during deployment of diffuser 22 and the diffuser 22 includes rod 94 like that shown in FIGS. 6-8.

Figure 12:
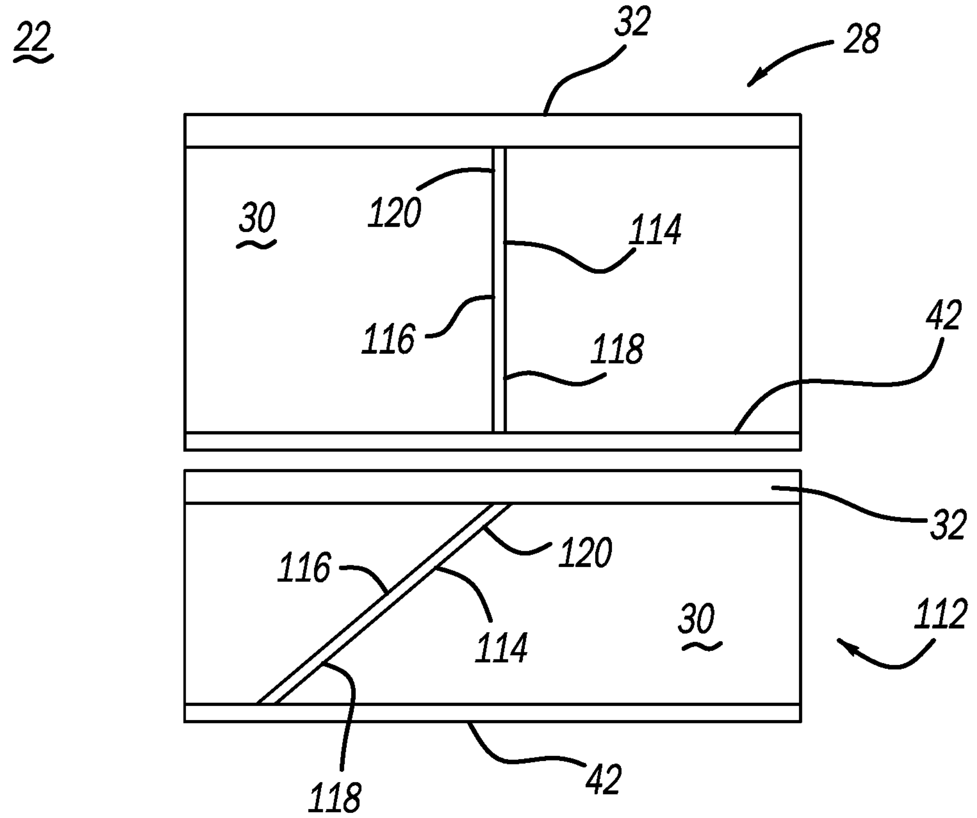
FIG. 12 is a schematic plan view of another example diffuser according to a principle of the present disclosure in a partially-deployed configuration and a fully deployed configuration.

Now referring to FIG. 12, a diffuser 22 is illustrated that includes a single strut 114 in the form of a deployment bar 116 having a first bar end 118 pivotably connected to and translatable along crossbar 42 and an opposite second bar end 120 that is fixed yet pivotably connected to roller tube 32. First bar end 118 may be connected to crossbar 42 in the same manner as shown in FIG. 11. That is, first bar end 118 may be pivotably attached to a pinion 108 that translates along a crossbar 42 having a rack 104.

FIG. 12 is directed to a configuration where roller tube 32 moves away from crossbar 42 during deployment of diffuser 22, like that shown in FIGS. 2-5 and 9. It should be understood, however, that the strut 114 shown in FIG. 11 can also be applied to a configuration where roller tube 32 remains mated with housing 24 during deployment of diffuser 22 and the diffuser 22 includes rod 95 like that shown in FIGS. 6-8.

Figure 13:
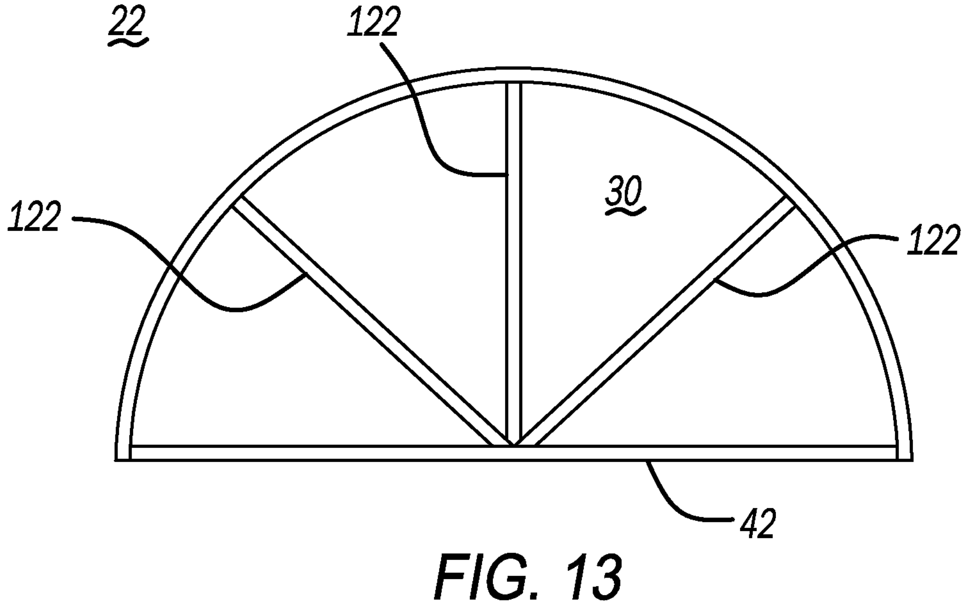
FIG. 13 is a schematic plan view of another example diffuser according to a principle of the present disclosure.
Figure 14:
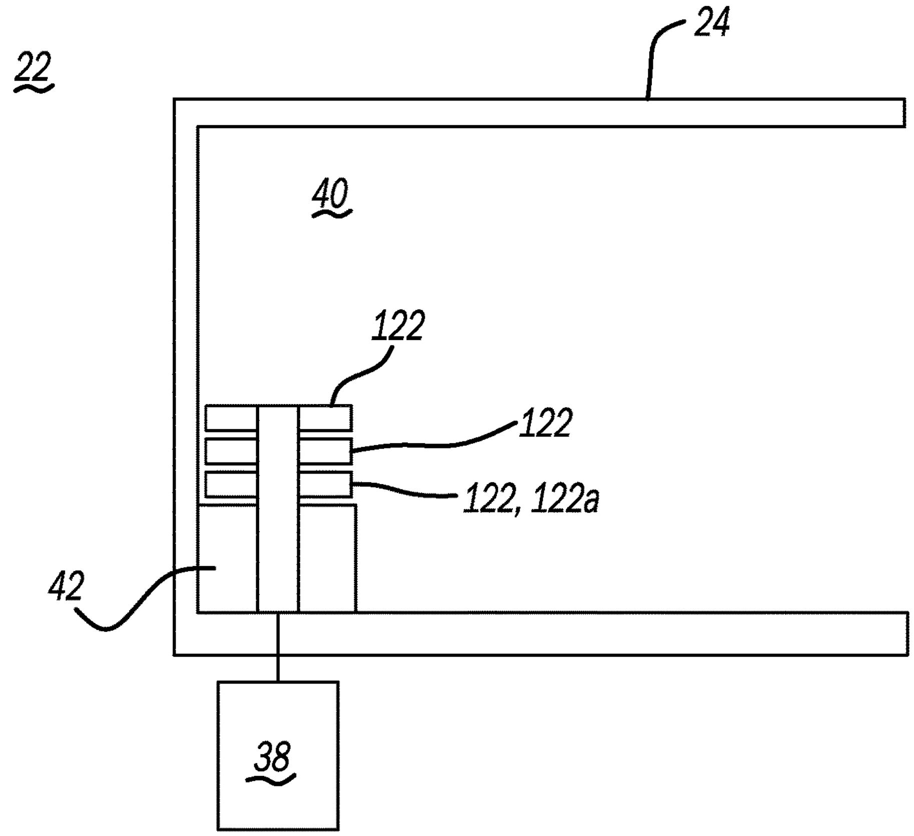
FIG. 14 is a schematic cross-sectional view of the diffuser shown in FIG. 13, in a stowed position.
Figure 15:
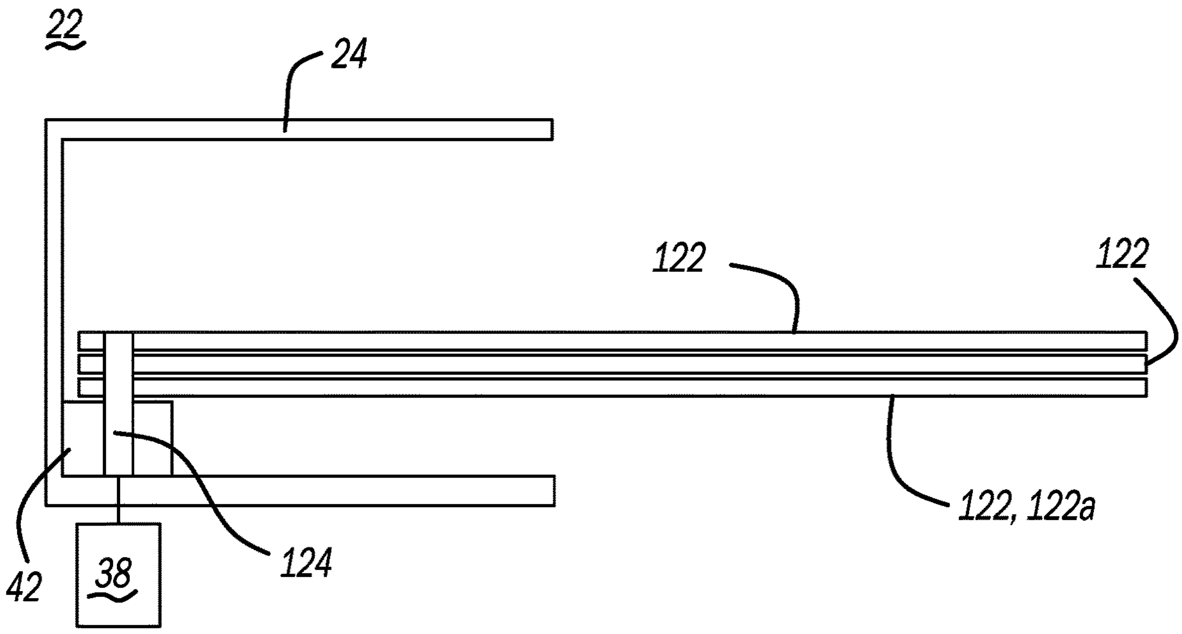
FIG. 15 is a schematic cross-sectional view of the example diffuser of FIG. 13 in a deployed position.

Sheet 30 does not necessarily need to be rectangular shaped, like the embodiments shown in FIGS. 5, 9, 10, and 12. In contrast, sheet 30 may be semicircular shaped like that shown in FIG. 13 and include a plurality of ribs 122. While ribs 122 are visible in FIG. 13 for illustration purposes, it should be understood that in practice ribs 122 may be sewn into sheet 30 such that as a first rib 122*a* is rotated by motor 38, it will begin unfurling sheet 30 from housing 24. In this embodiment, because sheet 30 will be folded rather than rolled in housing 24, roller tube 32 may be omitted. Thus, ribs 122 may each be coupled to crossbar 42 using a screw 124 that is rotatable by motor 38 to unfurl sheet 30 as shown in FIGS. 14 and 15. It should be understood that sheet 30 is omitted in FIGS. 14 and 15 for ease of illustration.

Lastly, it should be understood that the shape of sheet 30 is not limited to rectangular or semicircular and can be any shape desired by one skilled in the art. For example, in the embodiment shown in FIG. 12, the sheet 30 may be replaced by an essentially trapezoidal shape.

In each of the above-described embodiments, the diffuser 22 includes a fabric panel or sheet 30 that substantially reduces the mass associated with diffuser 22 and permits diffuser 22 to be easily stowed in a very small volume in comparison to conventional diffusers formed of solid materials. In addition, because each diffuser 22 includes a fabric panel 30, the diffusers 22 according to the present disclosure do not require expensive and unique molds to manufacture the diffusers 22. Thus, when a new model of vehicle 10 is designed, diffuser 22 can easily incorporated into the new model without significant capital expenditure. Moreover, even though diffuser 22 does not require a unique mold to manufacture the diffuser 22, the components of diffuser (e.g., housing 24 and roller tube 32) can each be styled to match the aesthetics of the vehicle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A vehicle comprising:

a vehicle body; and a diffuser configured to alter aerodynamic characteristics of the vehicle mounted to the vehicle body, wherein the diffuser includes:

a housing attached to the vehicle body;

a fabric panel attached to the housing that is configured to move between a stowed position located within the housing and a deployed position where the fabric panel extends outward from the housing and relative to the vehicle body, the fabric panel altering the aerodynamic characteristics of the vehicle when in the deployed position; and at least one strut that is configured to support the fabric panel when the fabric panel is in the deployed position and be stowed with the fabric panel in the housing when the fabric panel is in the stowed position;

wherein the vehicle further comprises a roller tube including a spool, the fabric panel being rolled over the spool when the fabric panel is in the stowed position and unrolled from the spool when the fabric panel is in the deployed position; and further comprising a controller in communication with a motor, the controller being configured to actuate the motor to move the fabric panel to the deployed position when the vehicle reaches a predetermined velocity, and configured to actuate the motor to move the fabric panel to the stowed position when a velocity of vehicle falls below the predetermined velocity.

2. The vehicle according to claim 1, wherein the fabric panel has a first end attached to the housing and a second end attached to the spool, in the deployed position of the fabric panel the roller tube is located distal from the housing and supported by the at least one strut, and in the stowed position of the fabric panel when the fabric panel is rolled over the spool, the roller tube is positioned within the housing.

3. The vehicle according to claim 2, wherein the at least one strut includes a first end attached to the housing and a second end attached to the roller tube.

4. The vehicle according to claim 3, wherein the at least one strut includes a first end attached to a pinion that is movably translatable along a rack that is provided in the housing and a second end that is pivotably connected to the roller tube.

5. The vehicle according to claim 3, wherein the at least one strut includes a first arm and a second arm, the first arm being pivotably connected to the housing and pivotably connected to the second arm, and the second arm being pivotably connected to the roller tube.

6. The vehicle according to claim 5, further comprising a wherein the motor is configured to pivot the first arm relative to the housing.

7. The vehicle according to claim 6, further comprising a controller in communication with the motor, the controller being configured to actuate the motor to pivot the first arm relative to the housing to move the fabric panel to the deployed position when the vehicle reaches a predetermined velocity, and configured to actuate the motor to pivot the first arm relative to the housing to move the fabric panel to the stowed position when a velocity of vehicle falls below the predetermined velocity.

8. The vehicle according to claim 1, wherein the roller tube is located within and fixed to the housing, the fabric panel has a first end attached to the spool and a second end attached to an elongated rod, and in the deployed position of the fabric panel the elongated rod is located distal from the housing and supported by the at least one strut.

9. The vehicle according to claim 8, wherein the at least one strut includes a first end attached to the housing and a second end attached to the elongated rod.

10. The vehicle according to claim 9, wherein the at least one strut includes a first arm and a second arm, the first arm being pivotably connected to the housing and pivotably connected to the second arm, and the second arm being pivotably connected to the elongated rod.

11. The vehicle according to claim 10, further comprising a wherein the motor is configured to pivot the first arm relative to the housing.

12. The vehicle according to claim 11, further comprising a controller in communication with the motor, the controller being configured to actuate the motor to pivot the first arm relative to the housing to move the fabric panel to the deployed position when the vehicle reaches a predetermined velocity, and configured to actuate the motor to pivot the first arm relative to the housing to move the fabric panel to the stowed position when a velocity of vehicle falls below the predetermined velocity.

* * * * *